Feb. 6, 1923.
A. SILVERMAN
ILLUMINATOR FOR OPTICAL INSTRUMENTS
Filed July 28, 1920
1,444,400
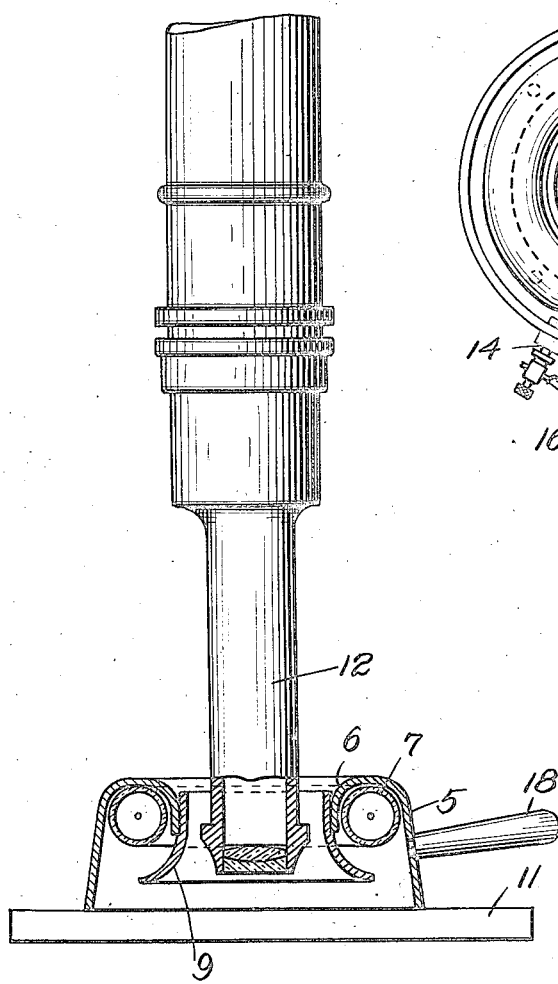
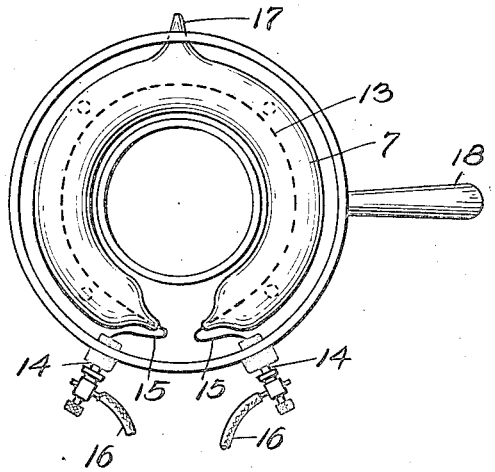
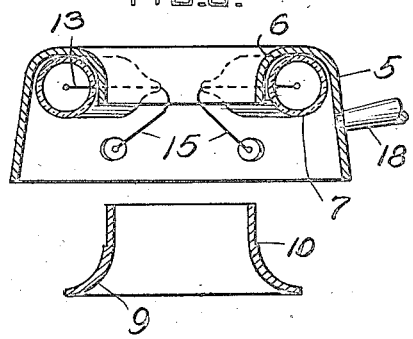
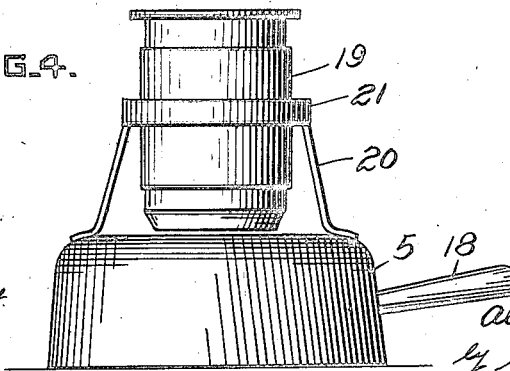
WITNESS
J. Herbert Bradley
INVENTOR
Alexander Silverman
by Green McCullister,
his attorney Patented Feb. 6, 1923.

1,444,400

UNITED STATES PATENT OFFICE.

ALEXANDER SILVERMAN, OF PITTSBURGH, PENNSYLVANIA.

ILLUMINATOR FOR OPTICAL INSTRUMENTS.

Application filed July 28, 1920. Serial No. 399,563.

*To all whom it may concern:*

Be it known that I, ALEXANDER SILVERMAN, a citizen of the United States, and a resident of Pittsburgh, in the county of Allegheny and State of Pennsylvania, have made a new and useful invention in Illuminators for Optical Instruments, of which the following is a specification.

This invention relates to illuminators for optical instruments such as microscopes and magnifying glasses, and has for an object to produce improved means for illuminating the field of such instruments.

A further object is to produce an illuminator of the kind specified, which is particularly effective in illuminating objects having light absorbing surfaces and which are incapable of being effectively illuminated by the modes of illumination now employed.

A further object is to produce an illuminator of the kind specified, which is particularly effective in illuminating objects such as textile fabrics.

A further object is to produce an illuminator for microscopes or magnifying glasses, which is adapted to be placed upon the object to be illuminated.

A further object is to produce an illuminator in which means are employed for illuminating the field of the optical instruments by indirect lighting and in which the apparent source of the light transmitted to the field substantially surrounds the field and transmits substantially equal amounts of light to all parts of the field.

A further object is to produce an illuminator for illuminating the field of an optical instrument by indirect lighting and in which the light reflecting surface or surfaces forming the source of the indirect light are so located with relation to the field that the object under examination is well illuminated but in such a way as to effectively bring out contrasts without occasioning objectionable shadows over portions of the object.

A further object is to produce an illuminator for optical instruments which illuminates the field by indirect lighting and is well adapted for use in connection with microscopic observations or photomicrography.

These and other objects are attained by means of an illuminator embodying the features herein described and illustrated.

In the drawings accompanying and forming a part hereof, Figure 1 is a sectional view of an illuminator embodying my invention and shown in connection with a fragmental view of a microscope, a portion of the microscope being shown in section for convenience of illustration. Figure 2 is a plan view of the illuminator shown in Figure 1. Figure 3 is a sectional view of the illuminator shown in connection with a sectional view of a removable shield which forms a part of the illuminator and a detail of my invention. Figure 4 is a side elevation of a magnifying glass or microscope mounted on an illuminator, such as is illustrated in Figures 1 and 2.

Various means have been devised for illuminating the fields of optical instruments such as microscopes, but so far as I know, no one has employed indirect lighting in illuminating the field of such instruments. In addition, I believe it is novel to employ artificial light in such a way that the apparent source of the light is spread over a relatively large area and is transmitted to the field of the instrument along lines approximately parallel to the field for the purpose of obtaining contrasts, occasioned by variations in the surface contour of the object under examination, without casting objectionable shadows into the depressed portions of the surface. I also believe that it is novel to employ an illuminator for optical instruments which is capable of being set on or supported by the object to be illuminated. The illuminator embodying my present invention embodies all these features and is, therefore, particularly effective in connection with certain kinds of microscopic and photomicrographic work and may be quickly and easily adjusted for the purpose of illuminating the field of the instrument.

In the illuminator illustrated, I may employ a shield between the source of light and the field, which may also function as a reflector in transmitting light to an annular reflecting or diffusing surface which is so located that it is exposed to the direct rays emanating from the source and is adapted to reflect or transmit light to the field to be illuminated. The annular reflecting surface may be termed "a diffuser", since in the broad sense it diffuses the light by increasing the size of the apparent source from which the light is transmitted to the field.

When the shield is employed, the field illumination is accomplished by indirect lighting, and the diffuser is so located and arranged that the entire field receives light of equal intensity so directed that contrasts due to variations in the surface contour of the object under examination are well defined without casting objectional shadows. It will be understood that the term "diffuser" is employed in its broad sense and that the diffuser may be provided with a dull or a highly polished reflecting surface.

As shown in the drawings, the illuminator includes a body portion which consists of a substantially cylindrical member 5 provided at its upper end with a re-entrant and downwardly projecting flange 6, so located with relation to the substantially cylindrical portion that it forms a recess in which an incandescent lamp 7 may be mounted. As shown, the bottom edge of the member 5 forms the support for the illuminator and the illuminator is adapted to be set upon the stage of a microscope when used for illuminating the field of such an instrument or it is adapted to be set upon the object under examination when the object is of such size and shape as to be capable of supporting it. An annular shield 9 engages the downwardly projecting portion of the flange 6 and extends downwardly therefrom into the space surrounded by the member 5. The shield is not as deep as the member 5 and, therefore, provides an annular light transmitting space between its lower edge and the plane defined by the supporting edge of the member 5. In addition, the shield is shown flared outwardly at its lower end, thereby forming a more effective reflector for reflecting the light emanating from the filament of the lamp 7, onto the interior face of the member 5. While the member 5 has been described as substantially cylindrical, it is, as shown, preferably inclined outwardly from the top to the bottom so that its inner light reflecting surface or diffuser is inclined at an angle, less than a right angle, to the plane defined by its supporting edge. The inner surface of this wall may be polished or it may be coated with a reflective coating of any suitable material. For example, it may be coated with a mirror surface, with white enamel or with a coating having a dull finish. The reflecting surface of the shield 9 may also be polished or provided with any other suitable reflecting coating.

The shield may be secured to the flange 6 in any suitable manner, but as illustrated, its upper portion is cylindrical and is adapted to snugly fit into the downwardly projecting portion of the flange 6. With such an arrangement, the shield may be readily removed and the illuminator may be employed without it. However, it will be understood that where indirect lighting is desired, the shield will be located in place as is illustrated in Figure 1. For the purpose of insuring a correct positioning of the shield with relation to the member 5, it is provided with an annular shoulder 10 which is adapted to engage the lower edge of the flange 6 when the shield is in place.

The shield is of such diameter that the objective of an instrument, such as a microscope, may be moved downwardly into the circular aperture surrounded by the flange so that the instrument may be focused on the object illuminated by the illuminator. As shown in Figure 1, the illuminator is mounted on the stage 11 of a microscope and the objective 12 of the microscope is moved into the space surrounded by the shield.

As shown in Figure 2, the incandescent lamp 7 with which the illuminator is equipped is provided with a substantially annular bulb, which encloses a substantially circular filament 13. The bulb surrounds the downwardly projecting portion of the flange 6 and is provided with a tip 17, which may project through an aperture formed in the member 5 for the purpose of holding the lamp in place. It will, of course, be understood that any suitable means may be employed for mounting the lamp in the illuminator. The illuminator is provided with terminal posts 14, which are mounted on the member 5 and project outwardly therefrom. These posts are adapted to receive the terminal wires 15 of the filament 13 and also the wires 16 leading to the source of current. The illuminator is also shown as provided with a handle 18, which may be employed in adjusting its position.

In Figure 4, I have shown the illuminator associated with a magnifying glass 19. As there illustrated, the illuminator forms the base portion or the support for the optical instrument, and the instrument is so located on it that it is capable of being adjusted to different positions with relation to the aperture surrounded by the shield 9 or by the annular flange 6. As shown, posts 20 are secured to the illuminator and extend upwardly to an annular collar 21, which supports the stationary barrel of the instrument and is aligned with the circular aperture surrounded by the flange 6. In other respects, the illuminator illustrated in Figure 4 may be similar to the illuminator illustrated in Figures 1, 2 and 3.

The illuminator illustrated in Figures 1, 2 and 3 may be employed with any optical instrument, such as a microscope or magnifying glass. When employed in connection with a microscope, it is set upon the stage of the instrument in such a position that the aperture surrounded by the shield is in alignment with the axis of the objective of the microscope; it, of course, being understood that the object for examination is in place on the stage. The microscope is then adjusted, and in accomplishing this adjustment, the objective may be moved into the space surrounded by the shield.

The fact that the lamp employed in connection with the illuminator is provided with a substantially circular filament which is substantially concentric with the reflective surfaces of the illuminator ensures uniform lighting of the entire field, since all parts of the reflecting surfaces receive substantially equal amounts of light and therefore transmit substantially equal amounts of light. With such an arrangement, the field is subjected to concentrated illumination, but the apparent source of light is a relatively wide band which completely surrounds the field and consequently contrasts due to variations in surface contour of the object under examination are brought out without occasioning objectional glare or shadows.

When the shield 9 is removed, the illuminator transmits both direct and reflected light to the field, but the arrangement is such that whether the illuminator is used with or without the shield, light cannot be projected upwardly either from the filament or from a reflective surface of the illuminator, and consequently, illumination is accomplished without subjecting the observer to objectionable glare.

It will be apparent that an illuminator such as is illustrated in Figure 4 may be set upon the object under examination. This is also true of the illuminator illustrated in Figures 1, 2 and 3. For this reason, both illuminators are particularly convenient in the examination of such objects as fabrics, and in addition, the arrangement of the light reflecting surfaces is such as to make either illuminator particularly effective in the examination of white or colored fabrics, or of any objects having light absorbing surfaces.

While I have illustrated and described what I now believe to be the preferred embodiment of my invention, I desire to have it understood that various changes, modifications, additions and omissions may be made in the illuminator illustrated without departing from the spirit and scope of my invention.

What I claim is:

1. An illuminator of the character described comprising a source of light, a shield for said source adapted to shield the field from direct rays emanating from said source provided with an aperture for the reception of the objective of a magnifying instrument, and a light reflecting surface receiving light from said source and adapted to transmit light to field.

2. An illuminator of the character described, comprising a source of light adapted to substantially surround the field of an optical instrument, an annular shield adapted to shield the field from direct rays emanating from said source and having a central aperture formed therein and located in alinement with the illuminated field, and a light reflecting element surrounding said light source and receiving direct rays therefrom and adapted to surround the field and to transmit reflected light thereto.

3. An illuminating device for the field of an optical instrument, comprising a source of light, adapted to substantially surround the field, an annular shield adapted to surround the field and to shield the same from direct rays emanating from said source and having a central aperture adapted to receive the objective of an optical instrument, and a light reflecting surface receiving direct rays from said source and so located with relation to said shield and the field that the light reflected thereby is transmitted to the field along lines approximately parallel to the plane of the field.

4. An illuminator for the field of an optical instrument of the kind described, comprising a source of light adapted to substantially surround the objective of the instrument, an annular shield for preventing direct rays emanating from said source reaching said field and into which the objective may extend, a light reflecting surface surrounding said source and receiving light therefrom and adapted to surround the field of the instrument.

5. An illuminating device for the field of an optical instrument of the kind described adapted to rest on the stage of the instrument and comprising an annular support having a light reflecting surface, a substantially annular source of light mounted on said support, and an annular shield removably mounted on said support and providing an aperture capable of being aligned with the objective of the instrument, and adapted to shield the field from direct rays emanating from said source.

6. In combination in an illuminator for optical instruments, a member having an aperture adapted to receive the objective of the instrument, a source of light substantially surrounding said aperture, and a removable shield adapted to be mounted on said member between the field and the source of light.

7. An illuminator for the field of an optical instrument, comprising a member adapted to be set upon the surface to be illuminated, and having an aperture formed therein through which the objective of the instrument is adapted to project, a source of light mounted on said member and surrounding said aperture and an opaque shield having an aperture formed therein substantially concentric with the aperture of said member and projecting between the source of light and the object to be illuminated.

8. An illuminator for the field of an optical instrument, comprising a member adapted to be set upon the surface to be illuminated, and having an aperture formed therein through which the objective of the instrument is adapted to project, and an annular shield mounted on said member between the source of light and the field to be illuminated.

9. An illuminator for optical instruments, comprising a member adapted to surround the field to be illuminated, and having a substantially annular lamp receiving recess formed therein, a lamp mounted in said recess; and a shield having an observation aperture formed therein, mounted on said member and extending between the illuminated field and said lamp.

10. An illuminator for the field of an optical instrument, comprising a substantially annular member having a re-entrant and downwardly extending annular flange formed at the upper portion thereof, an incandescent lamp surrounding the downwardly extending portion of said flange and an annular shield mounted on said flange and projecting between said lamp and the object to be illuminated and having an aperture adapted to receive the objective of an optical instrument.

11. An illuminator for the field of an optical instrument, comprising a substantially annular member having a re-entrant and downwardly extending annular flange formed at the upper portion thereof a source of light mounted on said member, and an annular shield mounted on said flange and projecting between said source and the object to be illuminated.

12. An illuminator of the character described, comprising a member adapted to be set upon the surface to be illuminated, and having an observation aperture formed therein, and an optical instrument mounted on said member and aligned with said aperture a source of light mounted on said member and an opaque shield between said light source and the field of said instrument having an observation aperture formed therein.

In testimony whereof, I have hereunto subscribed my name this 26th day of July, 1920.

ALEXANDER SILVERMAN.